United States Patent [19]
Wallace

[11] Patent Number: 5,635,852
[45] Date of Patent: Jun. 3, 1997

[54] CONTROLLABLE ACTICE TERMINATOR FOR A COMPUTER BUS

[75] Inventor: Dean Wallace, Trabuco Canyon, Calif.

[73] Assignee: Linfinity Microelectronics, Inc., Garden Grove, Calif.

[21] Appl. No.: 423,747

[22] Filed: Apr. 17, 1995

[51] Int. Cl.⁶ .................................................. H03K 19/0175
[52] U.S. Cl. .................................................. 326/30; 326/90
[58] Field of Search ................... 326/30, 90; 333/22 R, 333/32; 375/257; 327/310; 379/394, 398

[56] References Cited

U.S. PATENT DOCUMENTS

| | | |
|---|---|---|
| 4,748,426 | 5/1988 | Stewart ........................ 326/30 |
| 4,792,745 | 12/1988 | Dobkin . |
| 4,831,283 | 5/1989 | Newton . |
| 4,920,339 | 4/1990 | Friend et al. . |
| 5,029,284 | 7/1991 | Feldbaumer et al. . |
| 5,099,137 | 3/1992 | Lattin, Jr. . |
| 5,120,909 | 6/1992 | Kutz et al. . |
| 5,184,033 | 2/1993 | Chiao ........................ 326/30 |
| 5,213,846 | 5/1993 | Lee . |
| 5,239,559 | 8/1993 | Brach et al. . |
| 5,239,658 | 8/1993 | Yamamuro et al. . |
| 5,254,883 | 10/1993 | Horowitz et al. . |
| 5,272,396 | 12/1993 | Mammano et al. . |
| 5,297,067 | 3/1994 | Blackborow et al. . |
| 5,309,569 | 5/1994 | Warchol . |
| 5,313,105 | 5/1994 | Samela et al. . |
| 5,313,595 | 5/1994 | Lewis et al. . |
| 5,319,755 | 6/1994 | Farmwald et al. . |
| 5,336,948 | 8/1994 | Jordan . |
| 5,338,979 | 8/1994 | Mammano et al. . |
| 5,362,991 | 11/1994 | Samela ........................ 326/30 |
| 5,381,034 | 1/1995 | Thrower et al. . |
| 5,398,326 | 3/1995 | Lee . |
| 5,455,523 | 10/1995 | Wallace et al. ........................ 326/30 |

OTHER PUBLICATIONS

Linfinity Microelectronics, Production Data Sheet LX6431/LX6431A/LX6431B, Precision Programmable References Rev. 1.0, Oct. 1994.

Linfinity Microelectronics, Production Data Sheet TL431/TL431A/TL1431, Precision Programmable References Rev. 1.0, Jan. 1995.

*Primary Examiner*—Edward P. Westin
*Assistant Examiner*—Jon Santamauro
*Attorney, Agent, or Firm*—Loeb & Loeb LLP

[57] ABSTRACT

A controllable active terminator for a computer bus providing low power, small size, switchable termination of a computer bus having a plurality of conductors. The active terminator includes a voltage reference circuit, an enable circuit, a buffer amplifier, and a plurality of output cells. The voltage reference circuit includes a power down circuit which turns the voltage reference circuit off, using the same control signal which also disconnects the termination resistors and output transistors of the output cells. The terminator uses FET technology to produce a low-power, small size, controllable terminator having stable and reliable operating characteristics. The amplifiers used in the active terminator comprise CMOS devices and thus are relatively small and consume relatively low power. When enabled, the voltage reference circuit is used to establish a reference voltage for the linear operation of the output transistors in the output cell. The output current is supplied by terminator power. Consequently, a more reliable and stable bus termination is provided by the present active terminator which uses relatively small and low power components. The output supply current capacity of the present terminator is greater than that provided by the prior art bus terminators.

20 Claims, 9 Drawing Sheets

CONTROLLABLE ACTICE TERMINATOR FOR A COMPUTER BUS

BACKGROUND OF THE INVENTION

1. Field of the Invention

This invention relates generally to the field of computer buses and more specifically to controllable active terminators for computer buses.

2. Description of Related Art

Computer systems typically use an electronic bus to communicate signals between various computing devices such as a processor, a memory, and input/output (I/O) devices. A computer bus typically to communicates address, data, and control signals between the computing devices connected thereto. In a digital computer system, the signals transferred over the bus are typically high frequency signals ranging between ground and $V_{cc}$. The signals are typically driven on the bus by bus drivers incorporated into each of the computing devices connected thereto.

A common computer peripheral interface is the Small Computer Systems Interface (SCSI). The SCSI bus is becoming increasingly popular because it reduces the I/O bottle neck in existing computer systems. However, as the frequency of the signals transmitted over the SCSI bus increase, and as the distances between the computer peripherals connected to the bus also increase, transmission line effects associated with the SCSI bus degrade the integrity of the signals transmitted over the bus. To provide optimum signal power transfer between computing devices and to reduce signal reflection due to impedance mismatches on the SCSI bus, the bus must be terminated in such a way that the impedance of the terminator is close to the impedance of the bus and the terminator should supply the maximum allowable current to the bus.

The SCSI-2 computer bus requires operation at 10 megabytes per second over a bus cable length of less than of 6 meters. Termination has become a critical design factor due to the increases in signalling frequencies, the potential distances between SCSI stubs, differences in cable design and other factors. For example, due to impedance mismatches on the SCSI bus, the ack and reg control signals may be reflected causing the ack and reg lines to be double clocked. One source of signal reflection is due to mismatches between cables having slightly different impedances. Another source of reflection is due to the "stubs" (i.e., the length of cable that is coupled to the primary SCSI bus) and the position of the stubs on the SCSI bus. Most efforts in improving the performance of the SCSI bus have been directed at reducing the deleterious effects of the reflection problems associated with the SCSI bus. Various termination techniques have been attempted.

For example, passive terminators have been used for terminating single-ended SCSI-1 devices. FIG. 1 shows a typical passive terminator which provided reliable operation even when the SCSI-1 bus was fully configured and run at maximum cable lengths. As shown in FIG. 1, the passive terminator 100 terminates a bus signal line 102 into a resistive load consisting of a 220 ohm resistor 104 connected to the terminator power line 106 and a 330 ohm resistor 108 connected to ground. The effective resistance of the passive terminator is equal to 132 ohms. Disadvantageously, the passive terminator 100 provided a resistive path between the terminator power line 106 and ground even when the signal line 102 is not active (i.e., at high impedance). Therefore, the passive terminator 100 used in the prior art computer bus systems dissipates power continuously, even when all of the bus signal lines 102 are negated. For a terminator with a nominal power supply voltage of 5.0 volts, the passive terminator 100 dissipates 50 mW (10.00 milliamps×5.0 volts) for every inactive bus signal line 102. Another disadvantage of the passive terminator 100 shown in FIG. 1 is that the Thevenin voltage is not regulated and thus varies with variations in the terminator power supply 106. For example, a terminator power variation between 4.25 volts and 5.25 volts causes the output voltage to vary from 2.55 volts to 3.15 volts. Consequently, a correspondingly large variation in the current supplied to an asserted bus signal line (e.g., signal line 102) through the 220 ohm resistor 104 is produced. High tolerance resistors were required in order to limit the output current provided on bus signal line 102. The costs of manufacturing the passive terminator 100 were thereby increased.

Generally, the passive terminators of the prior art are modular devices which must be manually inserted onto the computer bus to provide termination and manually removed from the bus to remove termination when, for example, the computer bus is to be extended. Disadvantageously, physical access to the computer bus (e.g., opening enclosures which protect the device drivers and the bus) is required to effect such bus termination modifications. Therefore, a need exists for a controllable active terminator for a computer bus which can be selectively switchably connected to and disconnected from the computer bus.

Active bus terminators, such as the Boulay terminator shown in FIG. 2, have also been developed. Active termination of the computer bus provides a potential reduction of reflection problems caused by impedance mismatches on the bus. In general, the prior art active terminators attempt to reduce the reflection by compensating for voltage drops and maintaining a constant stable voltage to the terminating equipment resistors. The Boulay terminator 200 shown in FIG. 2 uses an active voltage regulation technique to improve noise immunity and reduce average power dissipation. The linear voltage regulator 202 produces a voltage source of 2.85 volts on line 204. As shown in FIG. 2, the 2.85 volts is provided in series with a plurality of termination resistors 206 which are connected to a plurality of computer bus signal lines 208. Typically, the plurality of termination resistors 206 comprise 110 ohm resistors having a 1% tolerance. The scheme shown in FIG. 2 is suited to terminate bus lines having a relatively low characteristic impedance, which is fairly common. Because the computer bus signal lines 208 are terminated by an active voltage regulation scheme, noise immunity is improved and a substantial reduction and average power dissipation is reduced. The reduction and average power dissipation is achieved because a negated or high impedance line conducts no current through its respective termination resistor 206. Thus, the only power dissipated by the Boulay terminator 200 for the negated line is the power dissipated by the linear voltage regulator 202. Typically, the linear voltage regulator 202 dissipates between 5 to 10 milliamps of current.

Furthermore, because the Thevenin voltage is regulated, the output current is substantially immune to variations in termination power. Disadvantageously, in order to provide the maximum current on the computer bus signal lines 208 and meet the impedance specification of the SCSI standard, the termination resistors 206 must have relatively low tolerance values. When the resistors are included on an integrated circuit device together with the regulator 202, laser trimming is required to produce resistors 206 having these low tolerance values. Consequently, the manufacturing costs associated with the prior art Boulay terminators were increased.

One attempt at providing a controllable bus terminator having voltage regulation is disclosed in the prior art and shown in FIG. 3. The voltage regulator 106 includes a differential amplifier 120, a transistor 140, a switchable current source 150, and a power transistor 142. The emitter of the power transistor 142 is coupled to the collectors of the output transistors 100 as shown. The differential amplifier 120 works with the transistor 140 and the switchable current source 150 in order to control the conduction of the power transistor 142 and thereby hold the regulator's output voltage 127 constant. Disadvantageously, the voltage regulator 106 supplies current directly to the output transistors 100 via the collectors of the transistors 100. The current capacity of the output of the terminator is consequently limited by the current capacity of the regulator 106. Further, the voltage regulator 106 components are necessarily large due to the design of the terminator. For example, the power transistor 142 comprises a relatively large transistor which is necessary to source current to the plurality of output transistors 100.

Furthermore, the voltage regulator 106 uses a transistor 130 to provide feedback from the output transistors 100 to the differential amplifier 120. As a result, the feedback provided the voltage regulator 106 is somewhat unpredictable due to voltage variations produced by the transistor 130 arising from variations in the output current. The design shown in FIG. 3 uses multiple output switches or transistors 100 to connect and disconnect the active terminator onto the computer bus. The use of multiple output switches disadvantageously increases the power dissipation and size of the terminator.

Moreover, the output transistors 100 operate in saturation when supplying current to the output signal lines 172. As a result, the controllable bus terminator shown in FIG. 3 is a relatively high current device. The output transistors 100 also operate in saturation during shutdown.

Therefore, there is a need for a controllable bus terminator having output transistors which operate in their linear range and is thus a relatively low current terminating device. There is also a need for a controllable bus terminator which can take advantage of field effect transistor (FET) technology to produce a lower power and relatively small active bus termination device. The present invention provides such a device.

SUMMARY OF THE INVENTION

The invention relates to a controllable terminator for a computer bus which is capable of being electrically connected to and disconnected from the bus by means of a control signal. The terminator uses FIit technology to produce a low-power, small size controllable terminator having stable and reliable operating characteristics.

The terminator includes a voltage reference circuit, an enable circuit, a buffer amplifier, and a plurality of output cells. The voltage reference circuit includes a power down circuit which turns the voltage reference circuit off, using the same control signal which also disconnects the termination resistors of the output cell. All of the amplifiers used in the present invention comprise CMOS devices and are thus relatively small and consume relatively low power. The voltage reference circuit is used to establish a reference voltage for the operation of output transistors in the output cell. The output current is supplied by terminator power. Consequently, a more reliable, stable, and higher output supply current capacity is provided by the present invention using relatively small parts which consume relatively little power.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Figure 4:
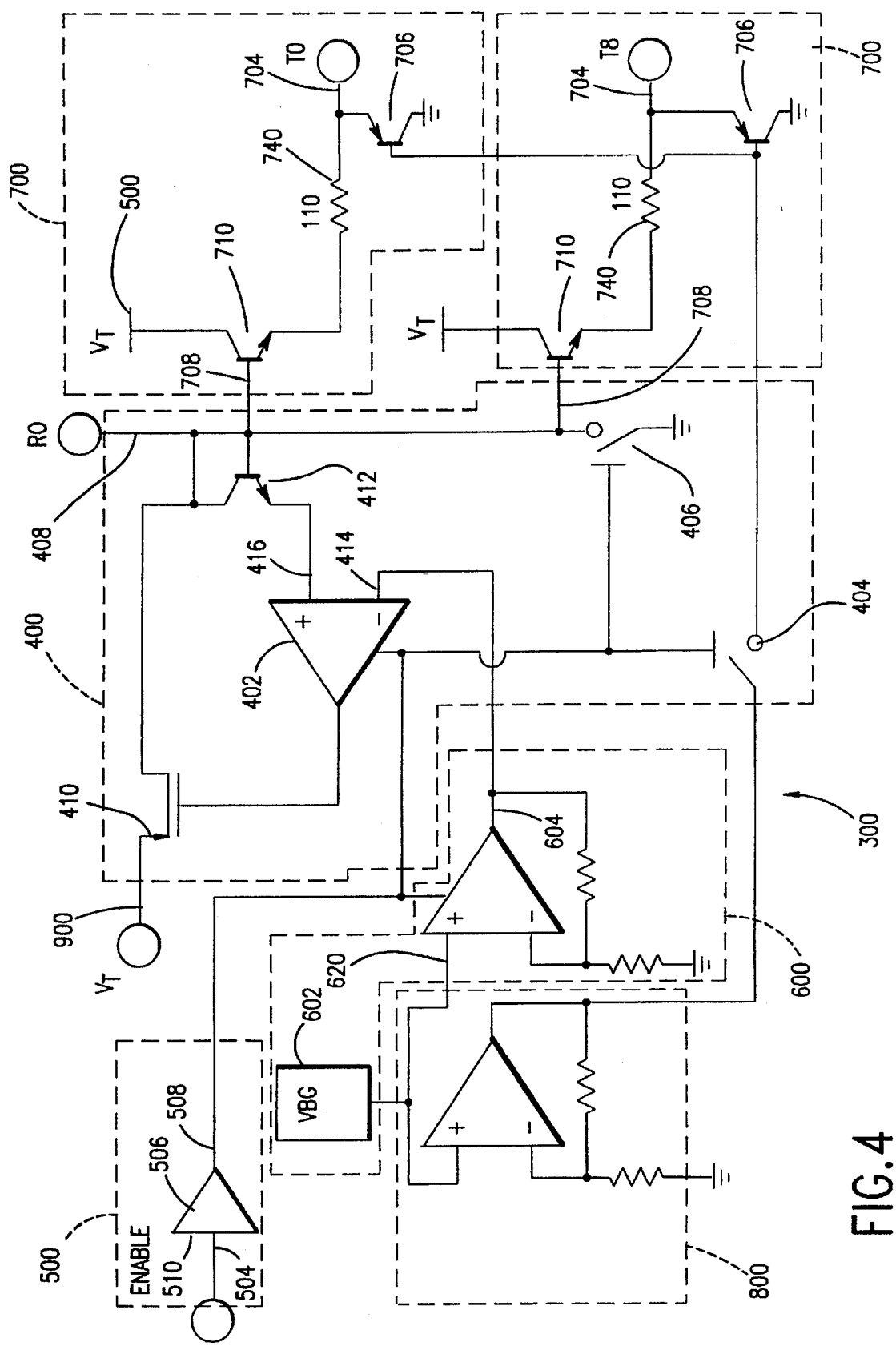
FIG. 4 is a block diagram of the preferred embodiment of the present invention.

FIG. 4 shows a preferred embodiment of the controllable bus terminator 300. In brief overview, the controllable bus terminator 300 includes a voltage reference circuit 400, an enable circuit 500, a buffer amplifier 800, and a plurality of output cells 700. The preferred embodiment of the present bus terminator 300 includes at least nine output cells 700 for driving nine active lines of a computer bus. One alternative embodiment includes eighteen output cells 700 which are used to terminate eighteen computer bus lines. The buffer amplifier 800 is used to supply sufficient current to a plurality of negative clamping circuits in the output cells 700.

Operability of the voltage reference circuit 400, the bandgap voltage 602, the buffer amplifier 800 and a reference amplifier 600 is controlled by an enable signal provided over a control line 504 and by a buffer driver 506. As shown in FIG. 4, the control line 504 and the buffer driver 506 produces a control voltage on an output 508 in response to an enable control signal applied to its input 510. When the enable signal is left open or driven high (i.e., the terminator 300 is disabled), the output signal of the buffer driver 506 turns off the voltage reference circuit 400 by disconnecting power from the bandgap voltage 602, the reference amplifier 600 and a differential amplifier 402 in the voltage reference circuit 400. A switch 406 is thereby closed to couple a reference voltage node 408 to ground and to thus disable the voltage reference circuit 400. A second switch 404 also disables a plurality of negative clamping circuits 706 described in more detail hereinbelow.

When the enable signal is driven low (i.e., the terminator 300 is enabled), the output signal of the buffer driver 506 turns on the voltage reference circuit 400 by connecting power to the bandgap voltage 602, the reference amplifier 600 and the differential amplifier 402. A switch 404 is closed which connects the output of the buffer amplifier 800 to the plurality of negative clamping circuits 706 in the output cells 700. At the same time, the switch 406 is opened and the reference voltage node 408 is thereby enabled.

Thus, the enable control signal on line 504 permits the controllable terminator 300 to be electrically disabled, effectively removing the output cells 700 from the computer bus. When the controllable active terminator 300 is disabled, the termination resistors 740 in the output cells 700 are inoperative and will not sink or source output current. Further, the voltage reference circuit 400 is placed into a low power mode of operation. In this mode of operation, the output cells 700 present a high impedance and low output capacitance to the terminated bus signal line. As a result multiple, disabled terminators may be positioned along the computer bus with very little degradation of the signals transmitted on the computer bus.

Each computer bus line 704 is coupled to the high side clamp circuit 706 which is designed to compensate for excess current supplied by active negation drivers during deassection on the computer bus lines 704. The clamping circuits 706 keep the deasserted voltage from rising too high. If the signal is too high, then deassertion becomes a problem.

In brief, the voltage reference circuit 400 includes a differential amplifier 402, two enable switches 404, 406, a pass transistor 410, and a feedback transistor 412. The differential amplifier 402 has a first input terminal 414 connected to an output terminal 604 of the reference amplifier 600. The reference amplifier 600 establishes a reference voltage at the first input terminal 414 of the differential amplifier 402 which is related to a desired termination voltage. In the embodiment shown, the reference voltage is set to approximately 2.85 volts, however other reference voltages may be used. A second terminal 416 of the differential amplifier 402 is connected to the reference voltage node 408 through the feedback transistor 412. The differential amplifier 402 works together with the reference amplifier 600 and the feedback transistor 412 in order to control the conduction of the pass transistor 410 and thereby hold the reference voltage node 408 constant in a manner well known in the art.

Figure 1:
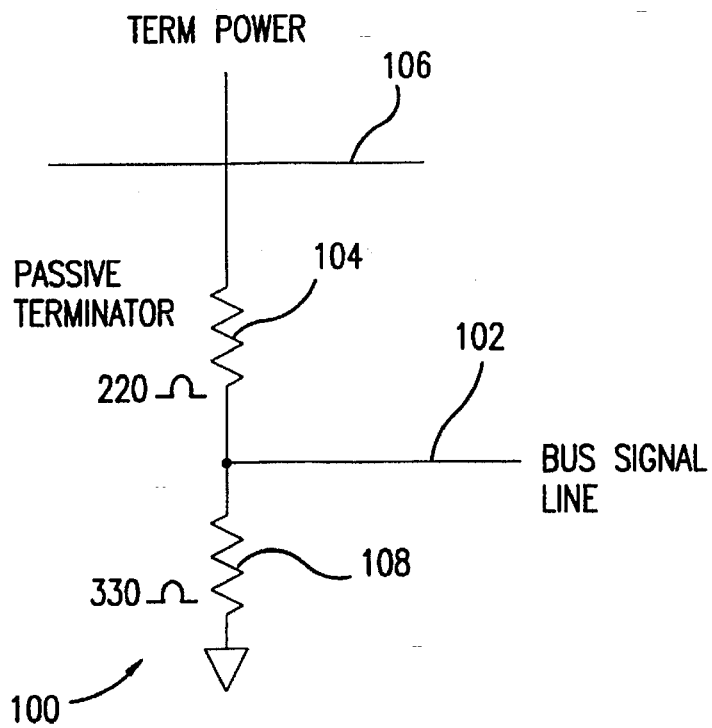
FIG. 1 is a schematic of a prior art passive terminator for a computer bus.
Figure 2:
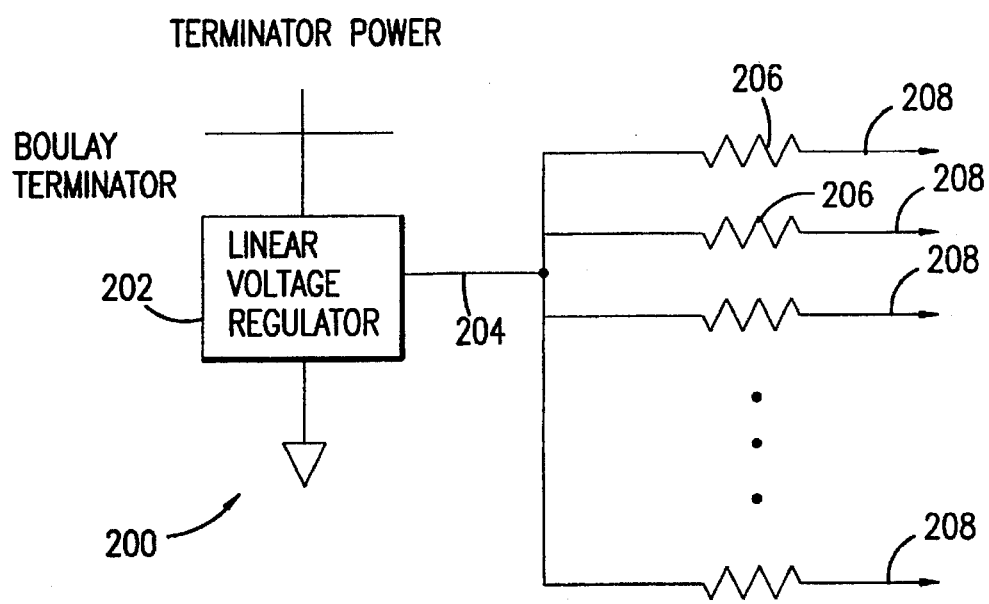
FIG. 2 is a schematic of a prior art Boulay terminator which uses active voltage regulation to improve noise immunity and reduce average power dissipation.
Figure 3:
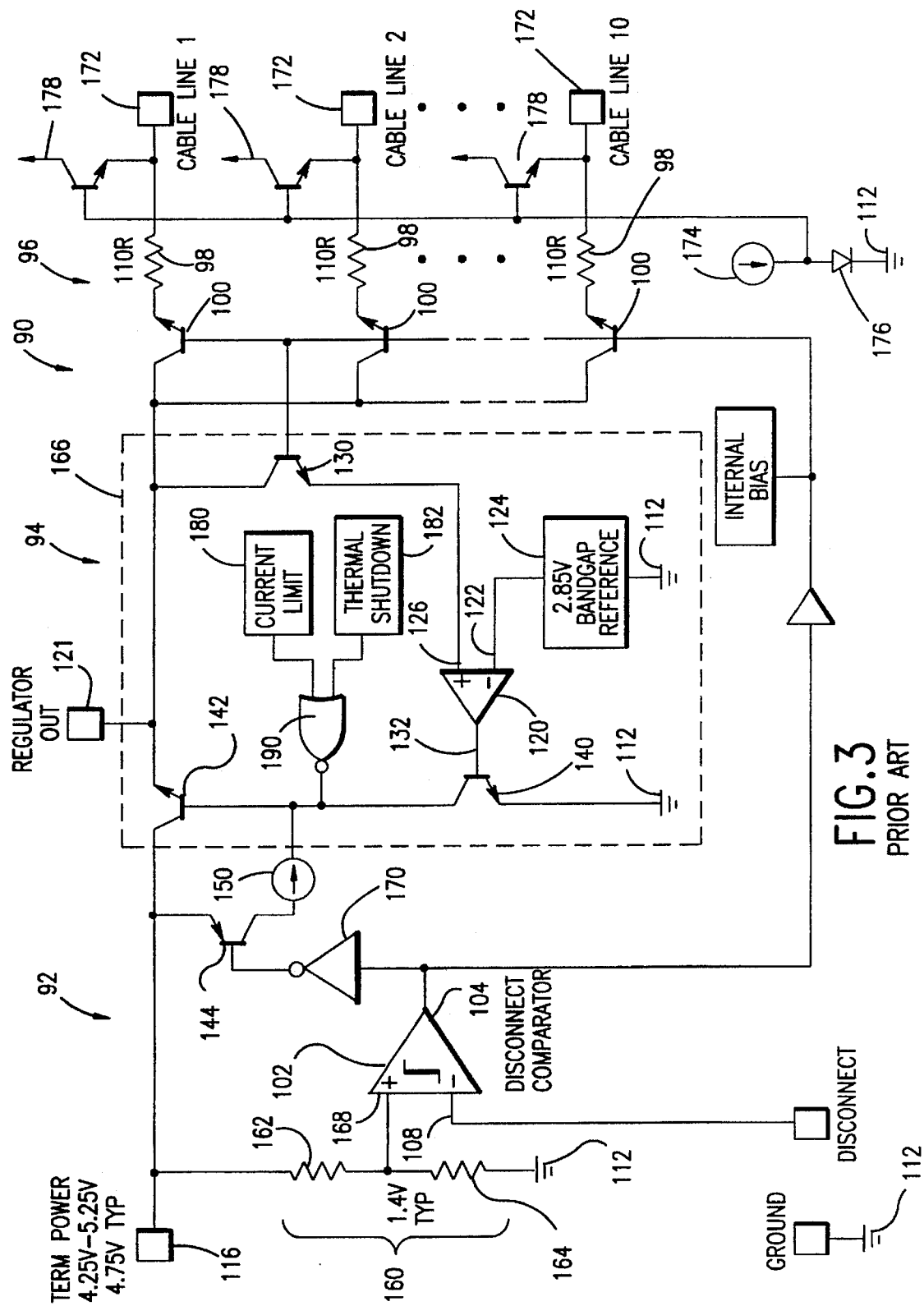
FIG. 3 is a schematic diagram of a prior art controllable active terminator for a computer bus.

As shown in FIG. 4, the bases and collectors of the feedback transistor 412 are electrically coupled together and connected to the reference voltage node 408. The voltage at the emitter of the output transistor 710 is one base-emitter voltage ($V_{be}$) drop differential from the voltage at the reference voltage node 408. Similarly, the voltage at the emitter of the feedback transistor 412 is one $V_{be}$ drop differential from the voltage at the reference voltage node 408. Due to the operation of the differential amplifier 402, the voltage at the second input 416 tracks the voltage at the first input 414. Advantageously, the voltage reference circuit 400 causes the voltage at the emitter of the output transistor 710 to track the voltage produced by the reference amplifier 600 and provided at the first input 414 of the differential amplifier 402. The connection of the feedback transistor 412 and output transistor 710 shown in FIG. 4 is a marked improvement over the prior art active terminator shown in FIG. 3. Given the use of the diode coupled transistor 412 mimicking the operation of the output transistors 710, the voltage at the emitters of transistors 710 is accurately tracked to the specified voltage for the SCSI standard.

As described above and shown in FIG. 3, the voltage regulator 106 controls the voltage produced at the collectors of the output transistors 100. The collector-emitter voltage drop ($V_{ce}$) controlled by the voltage regulator 106 disadvantageously varies with variations of the output current. Consequently, the voltage provided at the emitters of the output transistors 100 unpredictably varies as a function of output current. In contrast, the voltage provided at the emitters of the output transistors 710 depends upon the $V_{BE}$ voltage drop at feedback transistor 412, and not upon output current flow. Consequently, the voltage produced at the emitter of the feedback transistor 412 is relatively accurate despite variations in the output currents supplied to the computer bus lines 704. Therefore, the voltage produced at the second terminal 416 of the differential amplifier 402 remains relatively accurate, and the resulting reference voltage produced at the reference voltage node 408, in turn, remains relatively accurate.

Furthermore, because the voltage produced by the voltage reference circuit 400 can be carefully controlled by setting, no laser trimming of the termination resistors 740 is required. By biasing transistors 710 to be in the linear region of operation and setting the voltage at input 414, the current flow through all resistors 710 can be readily adjusted. Thus, the present active terminator 300 is more easily and less expensively manufactured than are the prior art active terminators.

The reference voltage node 408 is electrically connected to bases 708 of a plurality of output transistors 710 in the output cells 700. Thus, the voltage reference circuit 400 provides a stable reference voltage which is related to a desired termination voltage. The reference voltage produced by the voltage reference circuit 400 biases the output transistors 710 to operate in their linear range when the terminator 300 is enabled. Consequently, the quiescent and operational power dissipated by the terminator 300 is lower than that dissipated by the prior art terminators which bias their output transistors to operate in saturation when supplying current to the outputs. The collectors of the output transistors 710 are also connected to the terminator power bus 900. Thus, the current sourced to the bus computer lines is provided by the terminator power bus 900 (through the output transistors 710), and not by the voltage reference circuit 400 or a voltage regulator as was required by the prior art active terminator designs. Consequently, the present active terminator 300 has a greater current capacity and can be manufactured using smaller devices than those used by the prior art active terminators where a path element 142 must conduct sufficient current for the output loads. Because the output terminals 708 are coupled to the computer bus lines 704 in this manner, the pass transistor 410 is more readily implemented with a FET, as opposed to a bipolar transistor. Consequently, the present controllable active terminator 300 dissipates less power and is smaller than the prior art active terminators described above.

The bases 708 of the output transistors 710 are coupled to the same node 408 and connected to the disable switch 406. As described above, when the active terminator 300 is disabled, the disable switch 406 closes and the bases 708 of the output transistors 710 are electrically coupled to ground. This causes the output transistors 710 to turn off, which effectively disconnects the terminator 300 from the computer bus. Consequently, the computer bus lines 704 are connected to a high impedance. The output capacitance at the computer bus lines 704 is approximately 4.0 pF so that disabled terminators on the computer bus have very little deleterious effects on the integrity of the signals transmitted over the bus. Thus, the voltage reference circuit 400 is completely shut down when the terminator 300 is disabled. In addition to disconnecting power to the voltage reference circuit 400 and the reference amplifier 600, the reference voltage node 408 is electrically coupled to ground when the disable switch 406 is activated. Consequently, the present terminator 300 advantageously dissipates very little power when disabled. In one preferred embodiment, the current supplied to the present active terminator in disconnect mode is approximately as low as 1 µA.

Figure 5A:
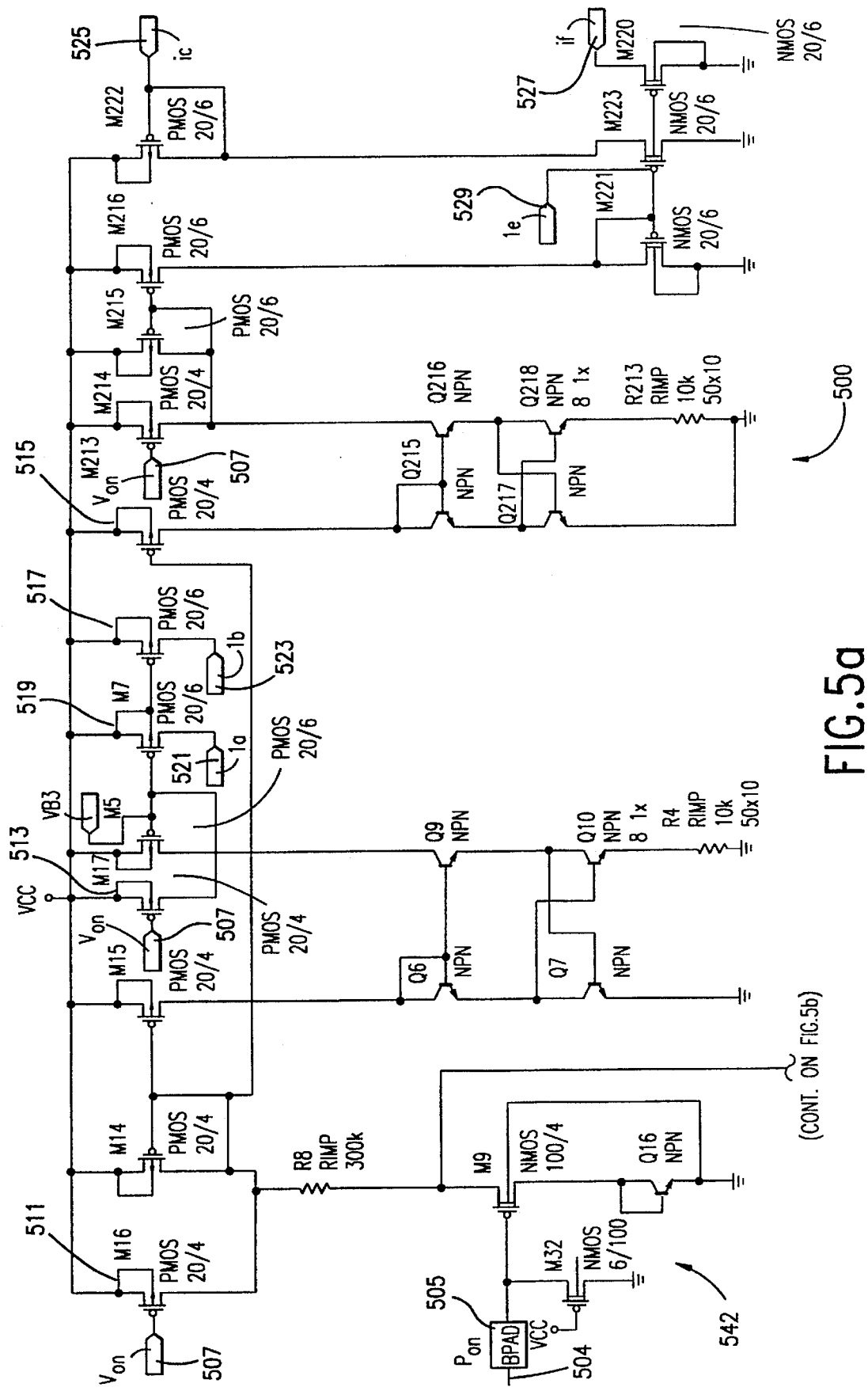
FIGS. 5a–5d are schematic diagrams of an embodiment of the invention shown in FIG. 4.
Figure 5B:
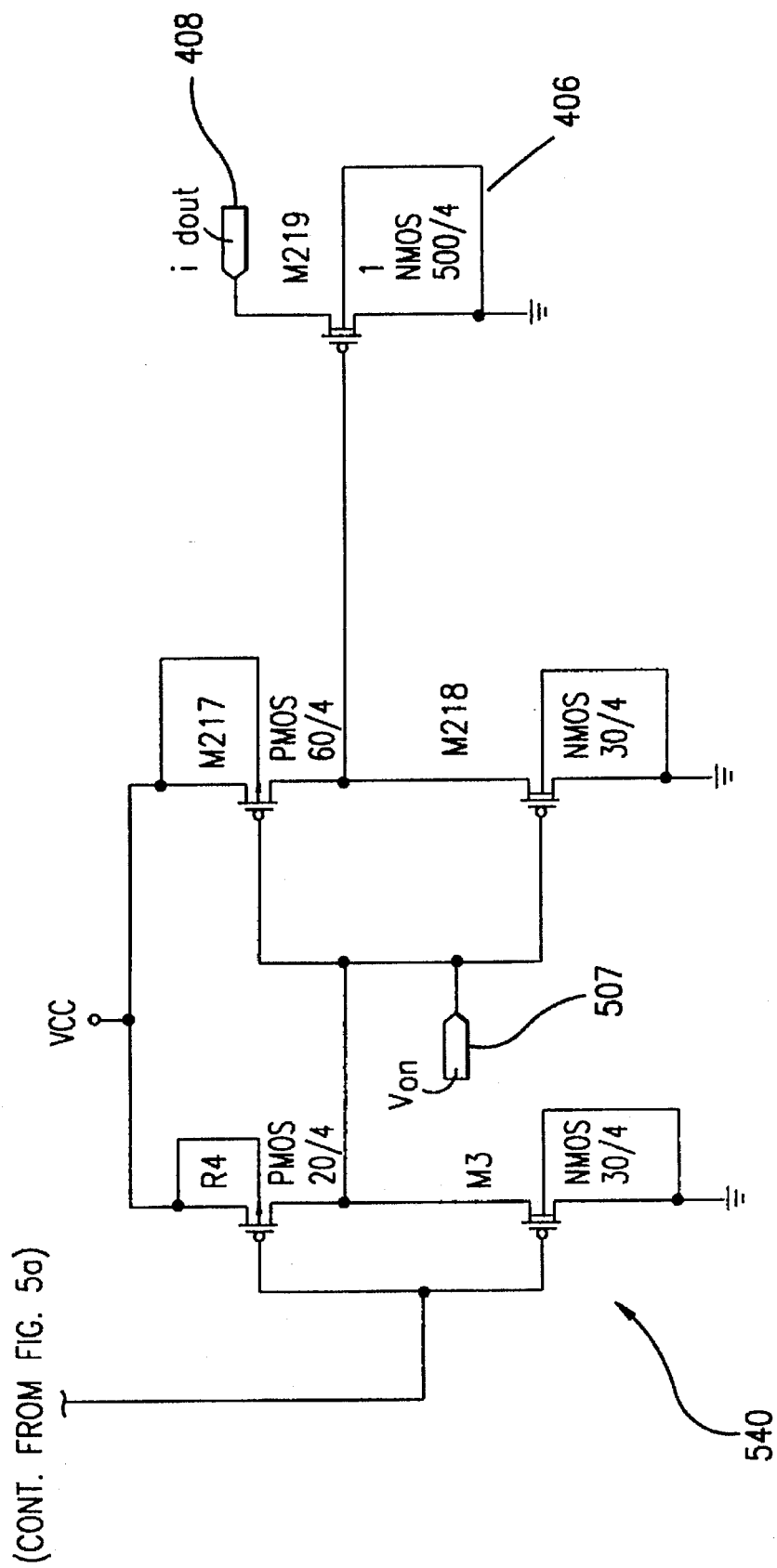
Figure 5C:
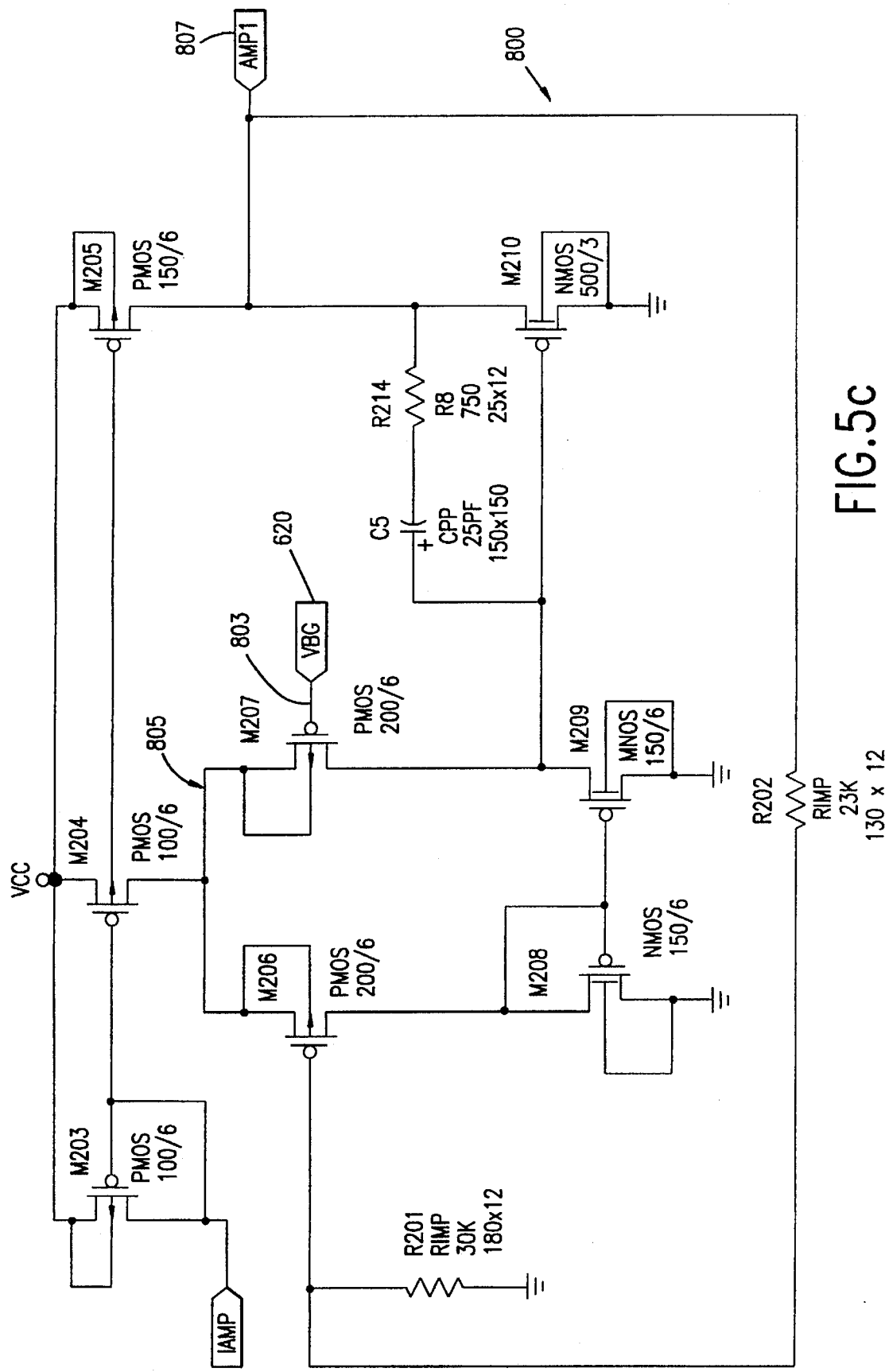
Figure 5D:
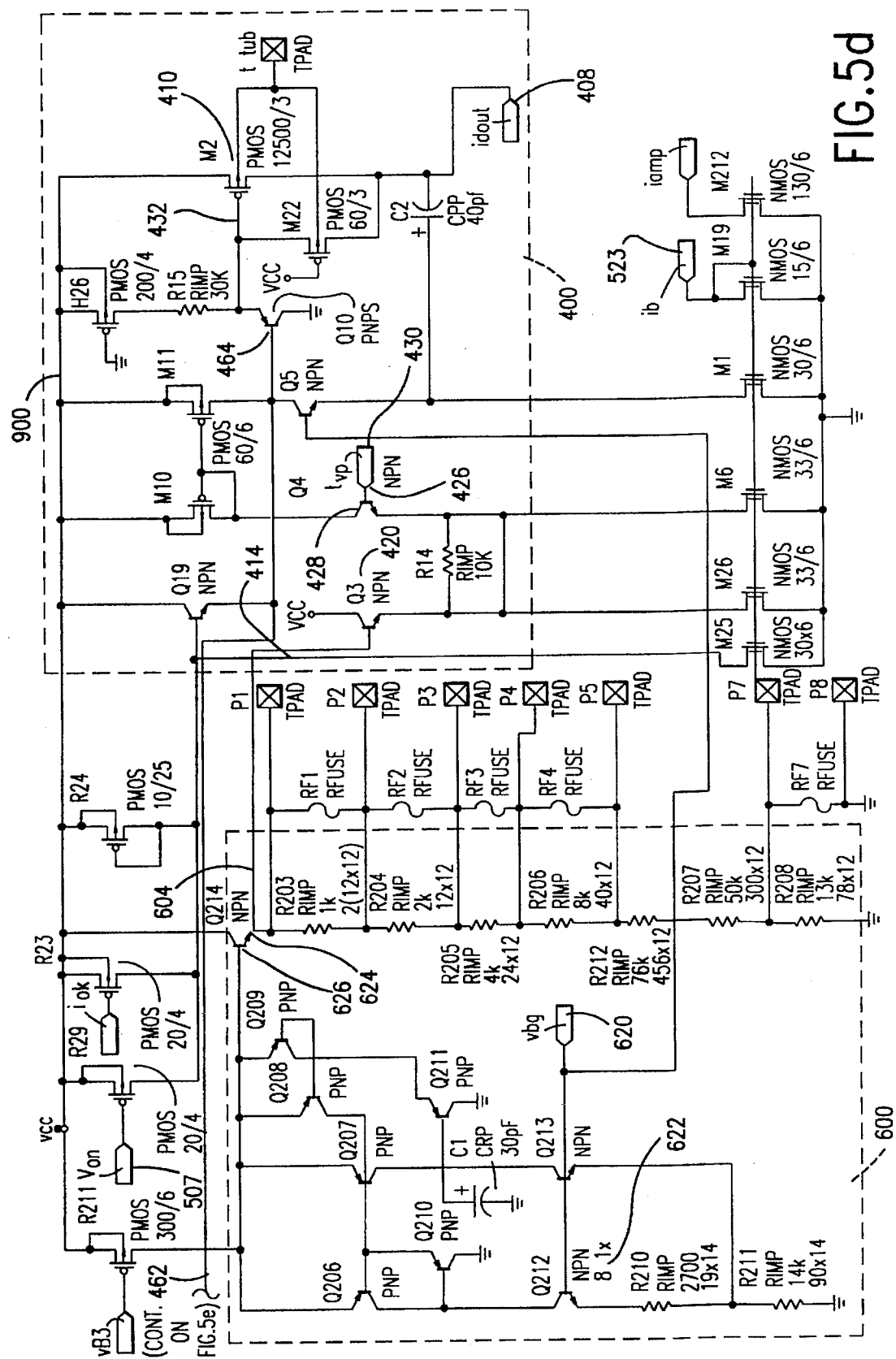
Figure 5E:
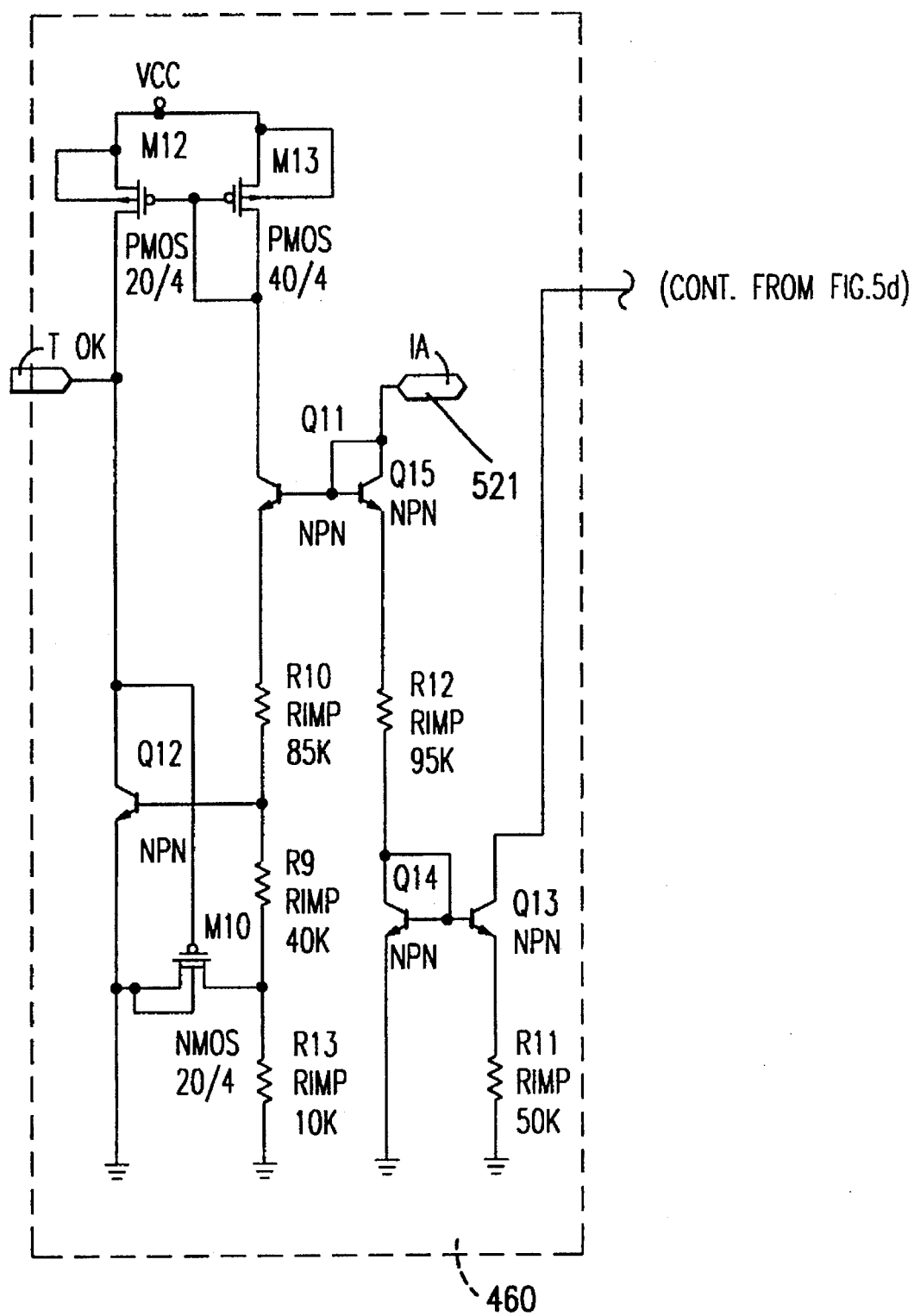
Figure 5F:
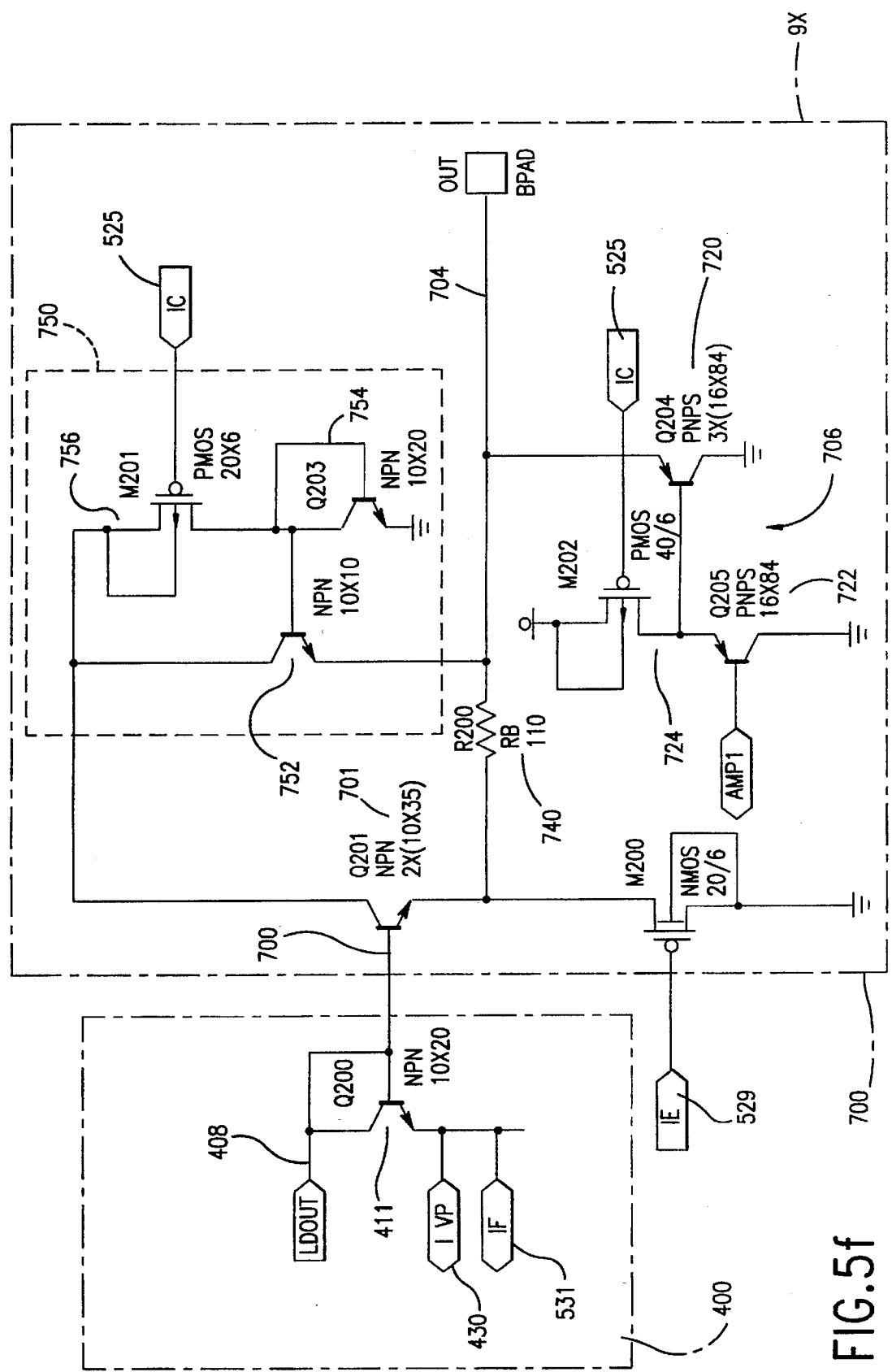

Referring now simultaneously to FIGS. 4 and 5a–5d, details of an integrated circuit embodiment of the active terminator 300 are now described. As described above, the bases 708 of the output transistors 710 (FIG. 4 and FIG. 5d) are connected together at the reference voltage node 408 (FIGS. 4, 5a and 5d). The enable signal 504 is coupled to a power-on ($P_{on}$) pad 505 which is, in turn, coupled to an inverter circuit 540 through a buffer 542. When the enable signal causes the $P_{on}$ pad 505 to be deasserted low (i.e., the active terminator 300 is disabled) a pull-down transistor 406 turns on and the reference voltage node 408 and the bases 708 of the output transistors 710 are pulled low. Transistor 722 is turned off so that the negative clamping transistor 720 is also turned off. Thus, when the active terminator of the present invention is disabled, the output transistors 710 present a high impedance output to the computer bus output lines 704.

When the terminator 300 is enabled, a $V_{on}$ signal 507 is asserted. As shown in FIG. 5a, the $V_{on}$ signal 507 is an input to the gates of FETs 511, 513, and 515. When $V_{on}$ is asserted, current switches 517 and 519 enable the voltage reference circuit (FIG. 5c) by providing current to other portions of the circuit via lines 521 and 523. The enable circuit 500 also includes biasing points 525, 527 and 529 which are externally controlled to optimize the operation of the active terminator 300.

The enable circuit 500 starts the current through M15 which sets up the current through M5 which is mirrored through M211 which provides the current for the bandgap ref (Q212, Q213, R210, R211). Transistor M211 provides the startup current for the bandgap circuit. The bandgap voltage is input to a noninverting input 803 of a differential amplifier circuit 805 as shown in FIG. 5b. The output of the buffer amplifier 800 is connected to other portions of the circuit via line 807. As shown in FIG. 5c, signal line 620 is also connected to a bandgap reference 600 at the base of an NPN transistor 622. The output 604 of the bandgap reference multiplied by the resistor divider network 600 is provided at the emitter 624 of an NPN transistor 626, which is connected to the base 414 (the first input terminal of the differential amplifier 402 shown in FIG. 4) of an NPN transistor 420. The bandgap reference 600 works together with the enable circuit 500 and the transistor 626 in a manner well known in the art to establish a reference voltage at the base 414 of transistor 420 which is preferably approximately 2.85 volts. Other reference voltages may be used to establish other output voltages. In addition, the voltage reference circuit 400 can be designed with a number of different configurations.

As shown in FIG. 5c, the second input to the differential amplifier 402 is connected to the base 426 of an NPN transistor 428. The base 426 of transistor 428 is connected to the emitter of the feedback transistor 412 shown in FIG. 5d over feedback signal line 430. A biasing point 531 is coupled to the same node as signal line 430. The output of the differential amplifier 402 is connected to a gate 432 of the pass transistor 410 which has its source connected to the terminator power bus 900 and its drain connected to the reference voltage node 408. The transistors 420, 428 work together with the feedback transistor 412 (FIG. 5d) to control the conduction of pass transistor 410 and thereby hold the reference voltage node 408 constant in a manner well known in the art.

The drain of the pass transistor is connected to the base of the feedback transistor and the bases of each output transistor 710. As described above with reference to FIG. 4, because the collectors of the output transistors 710 are connected to the terminator power bus 900 as shown, the pass transistor 410 may more readily comprise a FET. Consequently, the present controllable active terminator 300 requires less power and is smaller than the prior art active terminators which use a large power transistor for the pass transistor.

Thus, the voltage reference circuit 400 shown in FIGS. 4 and 5c maintains the bases 708 of the output transistors 710 at a known reference and thereby operate the output transistors 708 within their linear range when the active terminator 300 is enabled. As described above with reference to FIG. 4, because the output transistors 708 are operated in a linear range, the quiescent and operational power dissipated by the terminator 300 is lower than that dissipated by the prior art terminators which operate the output transistors in saturation. As described above with reference to FIG. 5a, the bases 708 of the output transistors 710 are connected to the drain of the pull-down transistor 406. Thus, when the active terminator 300 is disabled, and the pull-down transistor 406 conducts, the bases of the output transistors 710 are pulled to ground and the output transistors 710 are turned off. As a result, a high impedance output is presented on the computer bus lines 704. Moreover, during this mode of operation, the output capacitance of the terminator outputs remains relatively low which permits the use of multiple disabled terminators on the same computer bus with very little effect on signal integrity.

The output cell 700 shown in FIG. 5d also includes a clamp circuit 706 to make the terminator compatible with active negation drivers, which includes two PNP transistors 720, 722 and a FET 724 connected as shown. As described above with reference to FIG. 4, the clamp is used to sink excess current supplied by active negation drives as they pull the line high. If the line is allowed to go to high it becomes difficult to obtain a valid low voltage when the line is asserted. Although the high side clamp circuit 706 is shown connected at a point after the resistor 740 in FIG. 5d, the circuit 706 can optionally be connected to the opposite side of the resistor 740. Also, as shown in FIG. 5d, the output cell 700 can optionally include a negative clamping circuit 750 which includes two bipolar transistors 752, 754, and a FET transistor 756. The negative clamping circuit 750 operates in a well known manner to prevent the deassertion.

As shown in FIG. 5c, the voltage reference circuit 400 includes a thermal shutdown circuit 460 which provides thermal protection by disabling the voltage reference circuit 400 if the operating temperature exceeds a selected threshold. The thermal shutdown circuit 460 produces an output voltage on line 462 which is dependent upon the temperature sensed by the circuit 460. As shown in FIG. 5c, line 462 is coupled to the base of transistor 464. Thus, if the operating temperature exceeds a desired threshold, the transistor 464 conducts and pulls the gate of the pass transistor 410 low, thereby inhibiting the flow of current through the pass transistor and shutting down the reference voltage node 408.

Further, by selectively blowing any of fuses RF1 through RF7, the voltage at the first input 414 can be set. Therefore, by monitoring current flow at any of the outputs during wafer prove, the output current can be accurately set without laser trimming.

Thus, a controllable active terminator for a computer bus has been described. The active terminator uses a voltage reference technique to provide switchable termination of a computer bus. The reference voltage produced by the present invention is used to operate the output transistors which electrically connect termination resistors of the terminator output cells to the computer bus. The output transistors are operated in their linear range. The power dissipated by the present active terminator is thereby reduced. The sizes of the parts which comprise the present invention are also thereby dissipated. The outputs of the terminator are supplied current by the terminator power bus, and not by the voltage reference output. Consequently, the current capacity of the present active terminator is greater than that of the prior art terminators.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

I claim:

1. A controllable active bus terminator for switchably terminating a computer bus with a desired termination voltage, the computer bus having a plurality of bus signal lines, including:
   (a) a reference voltage generator generating a reference voltage related to the desired termination voltage;
   (b) a plurality of termination resistors, each resistor having a first and a second terminal, wherein the second terminal of each resistor is coupled to a different one of the bus signal lines; and
   (c) a plurality of bipolar output transistors, each transistor having a base, collector, emitter and a substantially linear range of operation, each transistor coupled at its emitter to the first terminal of a different one corresponding termination resistor, wherein the base of each transistor is responsive to the reference voltage such that each of the output transistors operate in the linear range of operation to provide the desired termination voltage at the emitter of each transistor.

2. The controllable active bus terminator of claim 1, wherein the active bus terminator can be selectively disabled by a control signal such that the terminator operates in a low power mode of operation when disabled.

3. The controllable active bus terminator of claim 2, wherein each output transistor is turned off when the terminator operates in the low power mode of operation.

4. The controllable active bus terminator of claim 2, wherein power is removed from the reference voltage generator when the terminator operates in the low power mode of operation.

5. The controllable active bus terminator of claim 1, wherein power is removed from the reference voltage generator when the terminator operates in the low power mode of operation.

6. The controllable active bus terminator of claim 1, wherein the plurality of termination resistors comprise 110 ohm resistors.

7. The controllable active bus terminator of claim 1, wherein the terminator further includes a terminator power bus, and wherein each output transistor supplies current from the terminator power bus to a different corresponding termination resistor.

8. The controllable active bus terminator of claim 7, wherein the reference voltage generator comprises a differential amplifier, a pass transistor, and a feedback transistor, the differential amplifier having a first input, a second input, and an output, the pass transistor having a gate, a source and a drain, the feedback transistor having a base, a collector and an emitter, and wherein the first input of the differential amplifier is established at a voltage related to the desired termination voltage, and wherein the second input of the differential amplifier is coupled to the emitter of the feedback transistor, and wherein the gate of the pass transistor is connected to the output of the differential amplifier, and wherein the source of the pass transistor is connected to the terminator power bus, and wherein the drain of the pass transistor is coupled to the collector of the feedback transistor, such that the reference voltage is generated at the collector of the feedback transistor which is related to the desired termination voltage.

9. A method for switchably terminating a computer bus with a desired termination voltage using an active terminator, the computer bus having a plurality of bus signal lines, the terminator including a plurality of termination resistors having a first and a second terminal, the second terminal of each resistor coupled to a different one of the bus signal lines, the terminator also including a plurality of bipolar output transistors, each transistor having a base, collector, emitter and a substantially linear range of operation, wherein each transistor is coupled at its emitter to the first terminal of a different one corresponding termination resistor, including:
   (a) generating a reference voltage related to the desired termination voltage; and
   (b) biasing the plurality of output transistors with the reference voltage such that each of the output transistors operate in the linear range of operation to provide the desired termination voltage at the emitter of each transistor.

10. A controllable active bus terminator powered by a terminator power bus for switchably terminating a computer bus with a desired termination voltage in response to an enable control signal, the computer bus having a plurality of bus signal lines, including:
   (a) a voltage reference circuit comprising a differential amplifier, a pass transistor, and a feedback transistor, the differential amplifier having a first input, a second input and an output, the pass transistor having a gate, a source and a drain, and the feedback transistor having a base, a collector and an emitter, wherein the first input of the differential amplifier is established at a voltage related to the desired termination voltage, the second input of the differential amplifier is coupled to the emitter of the feedback transistor, the output of the differential amplifier is coupled to the gate of the pass transistor, the source of the pass transistor is coupled to the power bus, and the drain of the pass transistor is coupled to the collector of the feedback transistor, and wherein the voltage reference circuit produces a reference voltage related to the desired termination voltage at the collector of the feedback transistor when the voltage reference circuit is enabled by the enable control signal, and wherein the voltage reference circuit outputs a high impedance signal at the collector when it is disabled by the enable control signal;
   (b) a plurality of termination resistors, each resistor having a first and a second terminal, wherein the second terminal of each resistor is coupled to a different one of the bus signal lines; and
   (c) a plurality of output transistors, each output transistor having a base, a collector, an emitter, and a linear range of operation, wherein each output transistor is coupled at the emitter to the first terminal of a different one corresponding termination resistor, and wherein the output transistors operate in the linear range of operation to supply the desired termination voltage at the emitter of each output transistor.

11. The controllable active bus terminator of claim 10, wherein the pass transistor is a field effect transistor.

12. The controllable active bus terminator of claim 10, wherein the terminator has a low output capacitance when it is disabled by the enable control signal.

13. The controllable active bus terminator of claim 12, wherein the output capacitance is approximately 4.0 pF.

14. The controllable active bus terminator of claim 10, wherein the reference voltage is approximately 2.85 volts.

15. A controllable active bus terminator for providing switchable termination for a computer bus, including:

a. a means for producing a reference voltage having a first and a second input, wherein a selected first voltage is applied to the first input; and wherein the reference voltage means outputs a stable reference voltage at an output terminal when the reference voltage means is enabled, and wherein the reference voltage means outputs a high impedance signal at its output terminal when it is disabled; and b. a plurality of output cells, operatively coupled to the reference voltage means, wherein the output cells include a plurality of output transistors and termination resistors, each transistor coupled at an emitter to a first terminal of a unique corresponding termination resistor, and wherein each termination resistor has a second terminal connected to a unique corresponding bus signal line, and wherein the output transistors supply current from a terminator power bus when the reference voltage means is enabled, and wherein the output transistors present a high impedance output when the reference voltage means is disabled; and c. wherein the power bus is coupled to the output transistors by a path other than the means for producing a reference voltage.

16. The controllable active bus terminator of claim 15, wherein the stable reference voltage is approximately 2.85 volts.

17. The controllable active bus terminator of claim 15, wherein the termination resistors comprise 110 ohm resistors.

18. A terminator circuit having active and inactive states comprising:

a voltage regulator providing a regulated voltage at an output in response to a comparison of a reference voltage and a feedback node;

a plurality of terminator resistors having first and second terminals;

a plurality of drive transistors each having input and output electrodes and a control electrode, one of the input and the output electrodes of each transistor coupled to the first terminal of each terminator resistor, the control electrode forming a junction with said one of the input and output electrodes, the junction having a characteristic, and the output of the voltage regulator being coupled to the control electrodes of the drive transistors; and a feedback junction device having a characteristic similar to at least one of the characteristics of the junction of one of the output transistors, the feedback junction device being coupled between the output of the voltage regulator and the feedback node, whereby the voltage regulator more accurately tracks the voltage being delivered at the one of the input and output electrodes.

19. The circuit of claim 18, wherein the output transistors operate in their linear region.

20. The circuit of claim 18, wherein power is removed from the reference voltage generator when the terminator operates in a low power mode of operation.

* * * * *